United States Patent [19]

Parkes

[11] 4,375,203

[45] Mar. 1, 1983

[54] PROSTHETIC CART FOR ANIMALS

[76] Inventor: Lincoln J. Parkes, 532 Newtown Rd., Berwyn, Pa. 19312

[21] Appl. No.: 272,688

[22] Filed: Jun. 11, 1981

[51] Int. Cl.[3] .............................................. A01K 29/00

[52] U.S. Cl. .......................................... 119/1; 119/102

[58] Field of Search ....................... 119/1, 29, 96, 102; 280/40, 652

[56] References Cited

U.S. PATENT DOCUMENTS

| | | | |
|---|---|---|---|
| 678,117 | 7/1901 | Koch | 119/102 |
| 2,546,726 | 3/1951 | Creamer, Jr. | 119/1 |
| 2,804,845 | 9/1957 | Plumley et al. | 119/102 |
| 2,976,840 | 3/1961 | Hugus | 119/1 |
| 3,215,117 | 11/1965 | Short | 119/1 |
| 3,241,851 | 3/1966 | Dingbaum | 280/34 |
| 3,406,661 | 10/1968 | Parkes | 119/1 |
| 3,580,222 | 5/1971 | Dunn | 119/102 |

FOREIGN PATENT DOCUMENTS

| | | | |
|---|---|---|---|
| 2355578 | 5/1975 | Fed. Rep. of Germany | 119/102 |

OTHER PUBLICATIONS

Brochure: "New Freedom for Paralyzed Dogs," K-9 Cart Company, Malvern, Pa.

Adjustment Instructions for Prosthetic Cart, K-9 Cart Company, Malvern, Pa.

*Primary Examiner*—Robert P. Swiatek

*Attorney, Agent, or Firm*—J. Rodman Steele, Jr.; Lewis F. Gould, Jr.; Harvey D. Fried

[57] ABSTRACT

A mobile orthosis for a four-legged animal such as a dog having injured rear quarters comprises a wheeled cart to which the animal is to be harnessed, the cart having a yoke attachable to the animal's thorax, a hip support member for carrying the animal's rear quarters, and a shin support for the animal's rear legs. A preferred embodiment comprises a two-wheeled cart having a pair of adjustment blocks each having a plurality of axle holes, the axle being positionable with respect to the cart to approximate a balanced support of the rear quarters.

11 Claims, 7 Drawing Figures

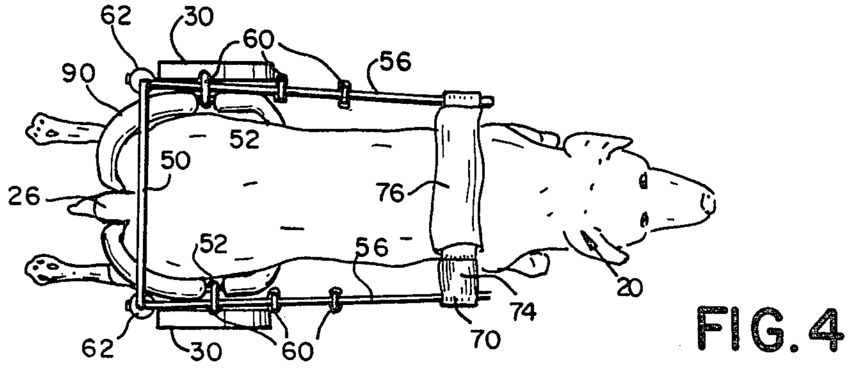
FIG. 4
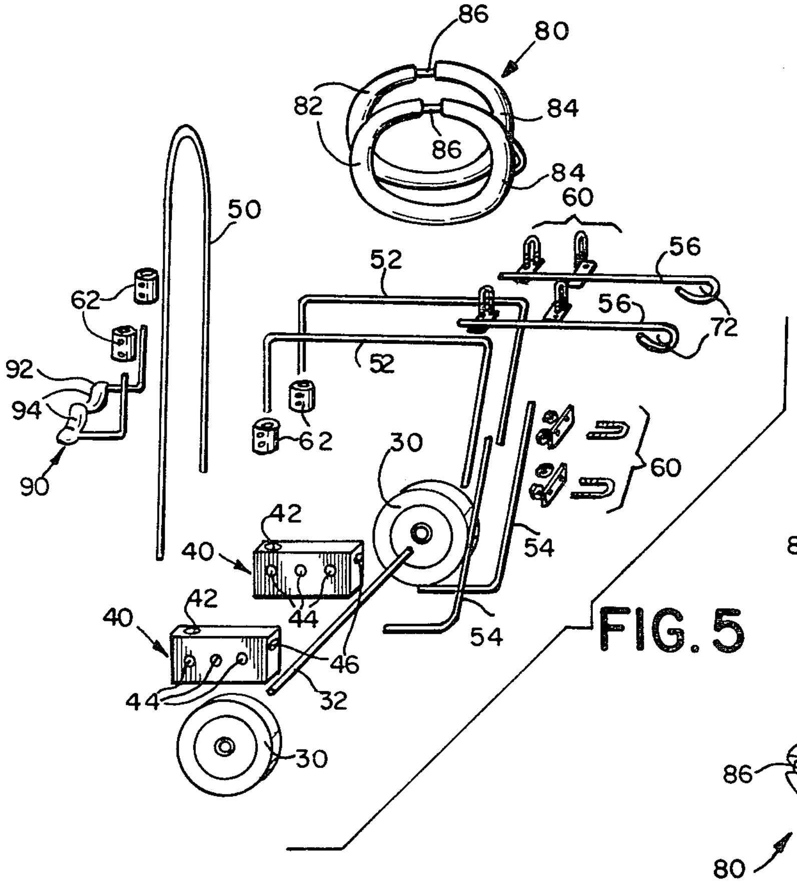
FIG. 5
FIG. 6b
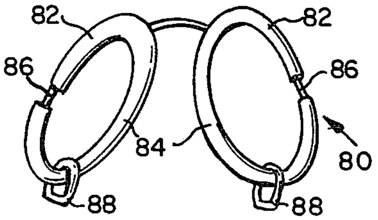
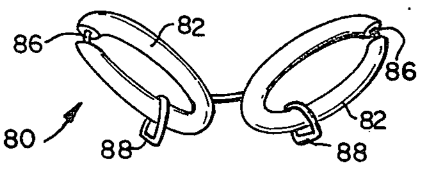
FIG. 6a

PROSTHETIC CART FOR ANIMALS

BACKGROUND OF THE INVENTION

1. Field of the Invention

This invention relates to the field of support devices for animals, and in particular to mobile devices for injured or paraplegic animals such as dogs.

2. Description of the Prior Art

Suspensory apparatus for injured animals are known to the art of veterinary medicine. Dogs and other household animals are often hit by cars, and some breeds have developed a genetic predisposition to degeneration of intervertebral discs and spinal cord elements. Since the owners of injured animals are willing to go to great lengths to preserve the lives and happiness of their pets, a number of devices have been developed to allow animals to enjoy somewhat natural activities, notwithstanding severe injury or disease.

When a dog develops a debilitating rear limb disorder, or suffers spinal damage due to a traumatic encounter with an automobile, the art has not been entirely successful in providing a suitable orthosis to allow the animal to resume a natural life. A paraplegic animal is susceptible to secondary disorders and unless relatively natural motion can be provided, the animal will be further injured and debilitated due to inability to ambulate.

Applicant has formerly developed a mobile suspensory apparatus for supporting the rear quarters of injured animals. U.S. Pat. No. 3,406,661 discloses a cart having a vertical standard extending upwardly in a loop from an axle having two wheels. A length-adjustable yoke member is attached to the standard at or near the natural height of the animal's hips, and a hip support member comprising two attached horizontal loops, through which the animal's legs are inserted, is attached to the standard slightly above the yoke member.

A similar two-wheeled apparatus having side rods for connection to a harness is disclosed in U.S. Pat. No. 3,215,117-Short. The Short apparatus supports the animal's rear quarters at its abdomen, and the side rods position the wheels at a predetermined distance from the harness.

Alternate approaches are illustrated in U.S. Pat. Nos. 3,241,851-Dingbaum and 2,546,726-Creamer, Jr. These patents teach apparatus which employ the animal's body itself as a large part of the support structure. Both teach attachment of wheels to injured animals in a manner reminiscent of the attachment of training wheels to bicycles.

At the other extreme, U.S. Pat. No. 2,976,840-Hugus discloses a complete structure having four casters and associated structure supporting a sling which both encloses and supports the animal. The animal's rear legs are allowed to hang through holes in the sling.

All of the foregoing patents are intended to allow the animal to pull itself along by its front legs while its rear quarters are supported in a wheeled apparatus. Each design, however, has certain attributes which detract from the animal's ability to move in a natural way. In the devices which may be characterized as attaching wheels to the animal's rear quarters, there is little to maintain the wheels in the proper position for supporting the animal while walking. If the animal is severely crippled or paraplegic, the rear quarters would presumably be completely limp, and the wheels would tend to roll forward or backward with respect to the animal and the point of attachment to the animal. Accordingly, such devices are primarily useful for dogs which are only partially crippled. Another attribute of these designs which leads to the same conclusion is the fact that the animal's rear legs are positioned on the ground, and if completely limp would tend to drag or to interfere with the wheels, particularly if the animal backs up.

While moving naturally, the hips of an uninjured animal will trace generally sinusoidal paths in both vertical and horizontal planes. Since wheeled suspensory apparatus for supporting the animal's rear quarters will maintain the rear quarters along a line parallel to the ground, at best the animal will, of necessity, move in a slightly unnatural way. Moreover, in order to avoid dragging the feet of animals supported in such wheeled apparatus, it has been formerly necessary to position the member supporting the rear quarters to a level high enough to hold the rear feet off the ground and possibly clear of the wheels. The references cited hereinabove each depict the animal's rear feet at or very near the ground. The one exception is Hugus, which shows the animal's rear legs hanging above their natural position, the legs being shown somewhat retracted. Of course a paraplegic animal is unable to retract its legs. In addition, in the situation where an animal retains some residual control of its rear quarters, the animal will instinctively attempt to use its legs in walking, whether suspended or not. Such movement further interferes with the wheels and axle, and with natural movement. Where an animal is completely limp, prior art devices have either held the rear quarters unnaturally high, or have allowed the feet to drag and/or interfere with the axle and wheels of the device.

U.S. Pat. Nos. 3,406,661-Parkes and 3,215,117-Short teach two-wheeled carts having a vertical standard upon which a yoke or harness is attached. The rear quarters are supported in each device by members interfacing with the animal's rear parts. Inasmuch as the weight of the rear quarters is supported forward of the vertical plane including the axle, a downward pressure is exerted on the yoke or harness. In addition, due to such positioning, the apparatus each have a tendency to rotate forward about the axle. Any downward force at the shoulders further detracts from the animal's ability to move around freely and naturally.

The foregoing tendency would be reversed if the animal backed up, or if the apparatus was adjusted such that the rear quarters were supported somewhere to the rear of a vertical plane including the axle. In this event, the apparatus could be expected to exert a force upward on the yoke, and to tend to rotate the apparatus rearward about the axle, raising the shoulders. If severely misadjusted or if the animal should hit an obstacle, the apparatus could be overbalanced and could fall over backwards. In any event, the force would detract from natural movement. Presumably, either apparatus could be adjusted to position the hips over the axle, but the hip position and the nature of the disclosed structures make the balance precarious and adjustment inconvenient and ineffective.

In light of the foregoing, it is apparent that there is a need to adapt mobile suspensory apparatus to the dynamics of the animal. The apparatus should be effective to support the rear quarters of the animal in as near a natural position as possible, yet should be convenient to adjust and insensitive to errors in adjustment. This requires that the device be balanced to achieve a minimum force either upwards or downwards at the yoke.

There has also been a need to adapt such suspensory apparatus to the alternative situations in which (1) the animal's rear quarters are completely limp and (2) the animal's rear quarters retain some residual movement.

The present invention accomplishes these goals by an apparatus which allows the rear quarters of the animal to be positioned at a natural level vertically with respect to the thorax of the animal, yet prevents the feet from dragging or interfering with the wheels. An embodiment is adapted to the situation in which residual movement is retained, and a second embodiment directed to completely limp rear quarters. The apparatus includes a convenient means for selectively positioning the axle at a range of positions, to balance the apparatus for a minimum of force on the yoke and to reduce the tendency to become misadjusted or overbalanced in use.

SUMMARY OF THE INVENTION

It is an object of this invention to provide a standardized mobile orthosis for crippled or paralyzed animals.

It is also an object of this invention to provide an orthosis which may be readily and securely adjusted to the exact dimensions of a particular animal, to support it in a natural position, and to allow the fullest possible freedom of movement.

It is another object of this invention to provide a comfortable yet durable apparatus which can withstand the rough handling expected.

It is yet another object of this invention to apply a standardized orthosis to both paraplegic animals and to those having residual movement in their rear limbs, due, for example, to a broken bone, spinal damage or to arthritic hips.

These and other objects are accomplished by a mobile orthosis for a four legged animal such as a dog having injured rear quarters, comprising a wheeled cart to which the animal is to be harnessed, the cart having a yoke attachable to the animal's thorax, a hip support member for carrying the animal's rear quarters, the hip support member adjustably mounted upon the cart for carrying the rear quarters at a natural position with respect to the thorax, and, shin support means for the animal's rear legs, mounted upon the cart and adjustable vertically thereupon, independently of the adjustment of the hip support means, whereby the animal's rear legs are carried above a natural position thereof. A preferred embodiment comprises a two-wheeled cart having a pair of adjustment blocks having a plurality of axle holes, whereby the axle may be positioned with respect to the cart to approximate a balanced support of the rear quarters. The shin support means may comprise a horizontal member having depressions for receiving the animal's legs, or a pair of slings may be provided for resilient support, especially suited for animals having residual movement in their rear legs.

BRIEF DESCRIPTION OF THE DRAWINGS

There are shown in the drawings the embodiments which are presently preferred. It should be understood, however, that the invention is not limited to the precise arrangements and instrumentalities depicted.

FIG. 4 is a top plan view of the invention, supporting an animal.

FIG. 5 is an exploded perspective view of the respective parts, only example fastening devices being depicted.

FIG. 6(*a*) is an elevation view of the hip support means of FIG. 5.

FIG. 6(*b*) is a top plan view of the hip support means of FIG. 5.

DETAILED DESCRIPTION OF THE PREFERRED EMBODIMENTS

Figure 1:
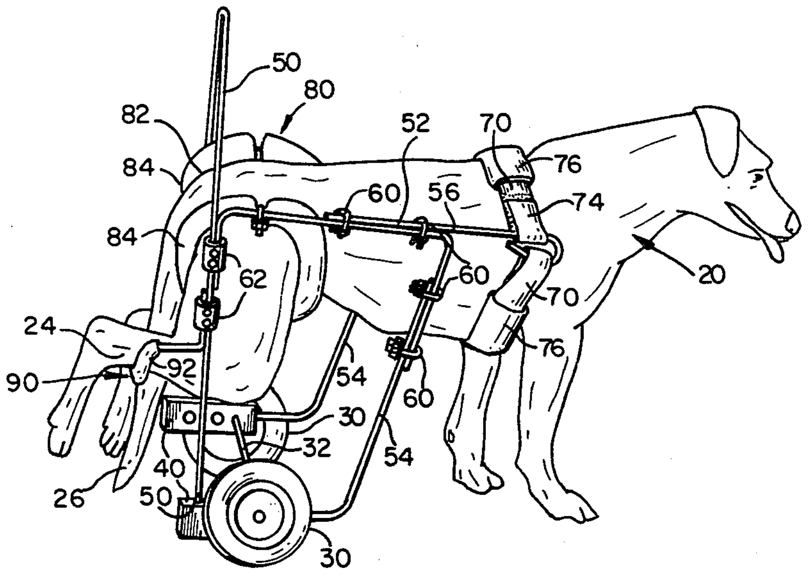
FIG. 1 is a perspective view of the invention, supporting an injured animal.

The apparatus of this invention is illustrated in use in FIG. 1. A dog or other four-limbed animal 20 has become injured and has lost full use of its rear quarters. The injury may have caused a complete blockage of neural signals along the spine, in which event the dog would be considered a paraplegic. The dog may possibly have suffered an injury to a bone or joint of a rear leg or foot, requiring restraint. The invention is also applicable to animals having severely restricted movement in their rear legs or hips.

A number of breeds have developed genetic traits involving intervertebral degenerative changes resulting in extrusion of disc content against the spinal cord, such as Dachshunds and Beagles. The German Shepherd and other large breeds are susceptible to primary cord degenerative changes. The rear legs of such animals may be completely or partially useless, or, they may be merely temporarily injured, requiring restraint in order to heal properly.

The present invention supports the rear quarters of the animal in a hip support member 80 which comprises padded loops through which the animal's rear legs are inserted. The hip support member is in turn supported by a carriage mounted on wheels 30. The weight of the animal's rear quarters is thus supported by the apparatus of the invention. In order to support and/or restrain the lower part of the rear legs, and to prevent them from interfering with the wheels 30 or axle 32, a shin support member 90 holds them slightly above their natural position.

The carriage chassis comprises a vertical standard 50 in the shape of an upward loop extending from adjustment blocks 40. The remaining chassis members 52, 54 form side members attached to the vertical standard. In contrast to prior art units, the side members of the chassis form a complete box or triangle of rigid bars or tubes. The construction is made more secure by the fact that hip support member 80 comprises a pair of padded loops 82 which are rigidly joined together and are also attached on each side to the chassis by means of U-bolts 60 at padding gaps 86.

The interconnection of chassis members is preferably accomplished using either U-bolts 60 or attachment cylinders 62. As is known in the art, attachment of tubular members is conveniently accomplished by a pair of U-bolt fasteners or by a single attachment cylinder having two bolts extending through threaded bores. Although a single U-bolt fastener would suffice to hold two tubular members together, a secure attachment and secure alignment of the attached members preferably require a pair of U-bolt fasteners.

The carriage chassis as described above is further attached to a yoke bar 56, adjustably attached to the upper horizontal member 52 of the chassis. An eye 72 in the end of yoke bar 56 provides a point of attachment for strap 70 which encircles the animal's thorax. A harness of the type having straps passing in front of the animal's front legs and/or around its chest is also possible. It will be appreciated, however, that the primary function of the yoke is to maintain the alignment of the chassis rather than to exert a forward force on the cart. The hips are securely held by hip support member 80, rigidly attached to the chassis, and only upward/downward, rather than forward/backward, force on yoke bar 56 will be experienced.

The box-like or triangular enclosures forming the chassis sides are completed by torsion members 54 extending from horizontal chassis members 52 to adjustment blocks 40. There are preferably three bar members and one attachment block included in each chassis side. A triangle being the most secure of structures, the chassis sides are quite strong and not subject to bending and deformation as the animal moves around.

As is apparent from the drawing, there are a number of adjustments available to fit the device to the dimensions of a specific animal. It should be appreciated that the adjustments could all be omitted, for example, where the device was produced in a range of sizes, and the proper size chosen for a specific animal. Moreover, the tubular members embodied in a single continuous length of tubing may be embodied in a number of alternative ways. For example, the lower portion of standard 50 could be embodied as part of the same continuous bar which includes horizontal chassis member 52. In this situation, the upper part of standard 50 would be a continuous length of tubing or steel bar with shin support 90. In such an embodiment, the vertical position of shin support 90 would also determine the height of the top of standard 50.

It is presently preferred that the standard be a single loop inserted at each end into adjustment blocks 40. Horizontal chassis member 52 is embodied in a length of bar or tubing having bends at each end, for attachment to standard 50 and torsion member 54, respectively. Torsion member 54 and shin member 90 are also preferably single lengths of bar or tubing. Hip support 80, described more fully hereinafter, comprises a pair of loops 84 having padding 82 thereupon at those locations which will contact and support the animal. Loops 84 are connected at gaps 86 via U-bolt fasteners, to horizontal chassis member 52. To preclude injury to the animal by contact with the ends of the U-bolts, the U-bolts may be directed outwards.

In order to adjust the device for a specific animal, it is necessary first to set the vertical position of horizontal chassis member 52 such that the animal's hips and rear quarters are supported at the natural height thereof. In so doing, a relatively natural motion of the animal is assured. Since hip support member 80 is horizontally positioned near the rear of the device, and since the vertical position of hip support 80 is determined with reference to the animal, "horizontal" chassis member 52 may slope upward or downward slightly in order to provide a convenient location for yoke eye 72. The placement of the yoke eye 72 is horizontally adjusted by sliding yoke member 56 forward or backward to position the yoke eye just behind the animal's shoulders where yoke strap 70 may be worn comfortably.

Figure 2:
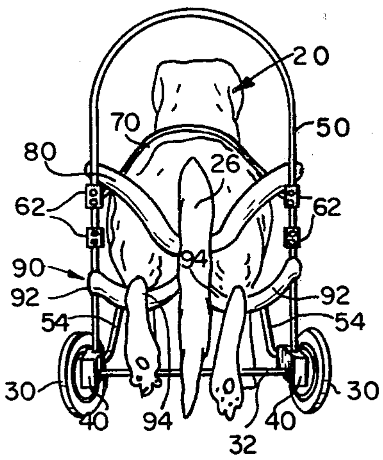
FIG. 2 is an elevation view of the apparatus of FIG. 1.
Figure 3:
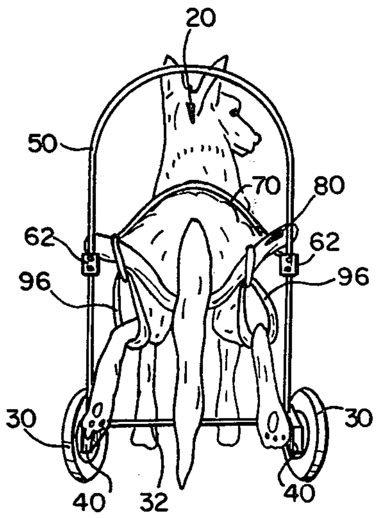
FIG. 3 is an elevation view of an alternative embodiment, corresponding to FIG. 2.

Having positioned the animal's rear quarters at or near their natural position, the feet will hang to the ground. A problem is thus presented by such natural positioning, namely, dragging of the animal's rear feet, or interference with axle 32. To prevent such interference while at the same time permitting the rear quarters to be naturally positioned, shin support member 90 is positioned vertically along standard 50 and rigidly attached, for example, by means of U-bolt fasteners 60 or attachment cylinders 62. Shin support 90 is also covered with padding 92. Shin support 90 may be embodied either as a rigid member having a pair of depressions adapted to receive the legs, as shown in FIGS. 1 and 2, or may be embodied as flexible straps as shown in FIG. 3. The choice of embodiment will depend on whether there is residual movement in the animal's rear legs.

FIGS. 1 and 2 illustrate the preferred embodiment for an animal having completely limp rear quarters. Shin support 90 comprises a pair of depressions having padding 92 upon which the animal's rear legs are supported at the shins. As shown in FIG. 1, the depressions are positioned somewhat rearward of standard 50. Such positioning is preferred in order to support the legs near the feet, as opposed to the knee, thus placing less pressure on the part of the legs resting against the shin support.

In the embodiment of FIG. 3, flexible slings 96 are provided in place of horizontal shin support 90. Where an animal has residual movement in its legs, the animal will instinctively more its rear legs while moving the cart. Should the rigid shin support 90 of FIGS. 1 and 2 be employed for such an animal, its shins would become abraded by constant rubbing against the shin support member, even if padded. To avoid such abrasion, FIG. 3 illustrates supporting the rear legs resiliently. By this means, the animal's rear legs can move slightly and will be supported without undue abrasion. Slings 96 are preferably made of a stretch material, but adequately resilient support is also provided with nonstretch materials, such as canvas. While the rigid support 90 of FIGS. 1 and 2 attaches to vertical standard 50, the resilient slings of FIG. 3 are preferably suspended from hip support 80, for example using "D" rings 88. Of course both the resilient and rigid shin supports could be supported from either the standard 50 or the loops 82 of hip support 80. For ease of adjustment, the depicted embodiments are preferred.

FIG. 4 depicts the top plan view of the invention as shown in FIG. 1. As is apparent, the apparatus is symmetrical along the axis of the animal. Wheels 30 are positioned directly below the hip joint of the animal, the feet extending slightly to the rear.

The front of yoke bar 56 terminates in an eye for connection to strap 70. The strap may be a simple belt, for example a cinch belt closed by a buckle or other fastening means such as Velcro-type fastener 74. The Velcro fastener allows a more continuous range of adjustment and avoids sharp protrusion. As shown in FIG. 1, the belt is preferably covered with padding 76 for further comfort. It will appreciated that there are many ways in which the yoke can be attached to the animal, for example, by a harness or the like. Nevertheless, since the animal's rear quarters are securely held in hip loops 84, only vertical support is required from the yoke. Accordingly, belt 70 is the preferred attachment. Such a belt is superior to a rigid yoke bar, which would bump repeatedly against the animal while walking. The belt is also preferred over a full harness, which is unnecessary because no forward pull is exerted on the yoke bar.

The respective parts of the invention are shown in FIG. 5. For simplicity, strap 70 has been omitted, as have a number of the attachment devices. The respective parts are assembled as described above. The support provided by the device may be fine-tuned by adjustment of the position of axle 32 extending through adjustment blocks 40. Adjustment blocks 40 are bored for insertion of standard 50 and torsion member 54, which may be secured, for example, by set screws (not shown). A plurality of bores are provided for insertion of axle 32. These bores 44 are provided at a range of horizontal positions with respect to the attachment blocks to permit convenient balancing of the device. In order to improve the balance of the apparatus, for example by positioning the wheels more nearly under the animal's hip joints, axle 32 may be easily removed and repositioned at an alternate horizontal bore 44. Wheels 30 are attached to axle 32 by any convenient means, as known in the art, and axle 32 may be provided with knubs spaced inward from the ends, the knubs larger than bores 44, in order to prevent attachment blocks 40 from moving out of position relative to the axle. Wheels 30 may be attached to axle 32 by means of cotter pins, end caps, or other convenient means.

FIGS. 5, 6(*a*) and 6(*b*) illustrate the structure of hip support member 80. The hip support member comprises two loops 82 bearing padding 84 for comfort. The loops are joined toward the center of the cart and may be made of a continuous length of tubing or bar. Gaps 86 are left in padding 84 for attachment of hip support 80 to chassis members 52. U-bolts enclosing chassis bars 52 and the bars within hip support 80 securely align and hold hip support 80 at the correct position. The hip support is padded to prevent chafing and is comfortable because it cradles the upper rear legs, rather than merely crossing the animal's abdomen. Moreover, the loops are inclined toward their interconnection at the center of the device, padding the animal against any transverse motion. The loops are comfortable because they are shaped to complements the animal, and provide vertical and horizontal support and padding.

The disclosed apparatus represents a complete method whereby an injured animal can be conveniently supported and allowed the most nearly natural freedom of movement. The pet owner need only place the animal's rear quarters in a support mounted at their naturally occurring position on a wheeled cart, raise the animal's rear feet above their natural position, at least partly affix the feet to the cart, and balance the cart to place the wheels under the lead. Although vigorous activity and rough terrain are expected, the pet owner can precisely balance the cart to the situation by re-positioning the axle and wheels. With a two wheeled cart, the owner can lock the cart into position by attaching the stabilizing yoke to the animal.

The present invention is capable of a number of further embodiments, many of which will now be apparent to those skilled in the art. Reference should be made to the appended claims rather than the foregoing specification as indicating the true scope of the invention.

What is claimed is:

1. A mobile orthosis for a four legged animal such as a dog having injured rear quarters, comprising:

(a) a cart to which the animal is to be harnessed, the cart being movable on wheels and being attachable to the animal's thorax such that in use the animal can move itself and the cart under power of its front quarters;

(b) a hip support member, adjustably mounted upon the cart, for carrying the animal's rear quarters at a natural position with respect to the thorax; and, (c) shin support member for the animal's rear leg mounted upon the cart and adjustable vertically thereupon, independent of the adjustment of the hip support means, whereby at least a part of both the animal's rear legs are carried above a natural position thereof, permitting movement of the cart free of the rear quarters.

2. The mobile orthosis of claim 1, wherein the cart is two-wheeled and comprises a pair of adjustment blocks rigidly attached to the cart along an undercarriage thereof, the blocks supporting an axle having the wheels attached thereto, the adjustment blocks having a plurality of axle holes capable of supporting the axle at a plurality of positions, whereby the axle and wheels may be positioned to approximate natural support of healthy rear quarters.

3. The mobile orthosis of claim 2, wherein the cart comprises a vertical standard arranged in an upwardly directed loop attached to the adjustment blocks, the shin support member being vertically positionable with respect to the standard and rigidly attachable to the cart.

4. The mobile orthosis of claims 2 or 3, wherein the hip support member comprises a pair of padded loop members rigidly joined together and attachable to the cart by means of U-bolts enclosing said loop members and a portion of the cart.

5. A mobile orthosis for an animal such as a dog having injured rear quarters, comprising:

(a) a pair of support blocks having means for receiving chassis members and a plurality of transverse bores for receiving an axle, the axle extending through the support blocks and bearing wheels mounted on the axle;

(b) a vertical standard comprising an upwardly-extending loop, a lower part of the loop being rigidly attached to the support blocks;

(c) two horizontal chassis members, one end of each member being rigidly attachable to the standard at a range of distances above the blocks, an opposite end of each member having means for attachment to a yoke attachable to the animal's thorax;

(d) two torsion bar chassis members rigidly attached to the support blocks by one end thereof, and rigidly attachable to the horizontal chassis members forward of the standard; and, (e) a hip support member having two padded loops through which the animal's legs may be inserted, the loops being rigidly attached to one another and each being rigidly attachable to the horizontal chassis member at a range of distances from the standard.

6. The mobile orthosis of claim 5, further comprising a shin support member attachable to the orthosis to support the animal's rear legs at a position above a natural position thereof, whereby the legs are supported clear of the wheels and axle.

7. The mobile orthosis of claims 3 or 6, wherein the shin support member comprises a horizontally disposed member having two depressions therein for receiving the animal's rear legs, the shin support being attachable to the standard at a plurality of vertical positions.

8. The mobile orthosis of claims 3 or 6, wherein the shin support member comprises a pair of slings attachable to the hip support member, whereby the animal's rear legs may be resiliently supported by placing them in the slings.

9. A method of mobile support for a four legged animal having injured rear quarters, comprising the steps of:

(a) placing the animal's rear quarters in a support mounted on a cart at a natural position with respect to the animal, the support shaped to complement the rear quarters, the cart supported on wheels and being movable by the animal under power of its front quarters;

(b) raising at least a lower part of both the animal's rear legs above a natural position thereof, and at least partly restraining the lower part with respect to the cart; and, (c) balancing the cart by adjustably positioning the wheels beneath the rear quarters.

10. The method of mobile support of claim 9, wherein the restraining of the lower parts of the animal's rear legs is accomplished rigidly by placing each lower part over a rigid support member mounted upon the cart.

11. The method of mobile support of claim 9, wherein the restraining of the lower parts of the animal's rear legs is accomplished resiliently by supporting each lower part in at least one flexible member attached to the cart.

* * * * *